United States Patent
Luthy et al.

(10) Patent No.: US 7,101,115 B2
(45) Date of Patent: Sep. 5, 2006

(54) *IN SITU* STABILIZATION OF PERSISTENT HYDROPHOBIC ORGANIC CONTAMINANTS IN SEDIMENTS USING COAL- AND WOOD-DERIVED CARBON SORBENTS

(75) Inventors: Richard G. Luthy, Stanford, CA (US); Upal Ghosh, Ellicott City, MD (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 274 days.

(21) Appl. No.: 10/272,681

(22) Filed: Oct. 16, 2002

(65) Prior Publication Data

US 2003/0092583 A1    May 15, 2003

Related U.S. Application Data

(60) Provisional application No. 60/333,049, filed on Nov. 13, 2001.

(51) Int. Cl.
*B09B 1/00* (2006.01)
(52) U.S. Cl. ................ 405/128.1; 405/129.25
(58) Field of Classification Search ............ 588/315; 405/128.1, 128.15, 128.45, 128.5, 128.7, 405/128.75, 129.25
See application file for complete search history.

(56) References Cited

U.S. PATENT DOCUMENTS

| | | | | |
|---|---|---|---|---|
| 3,424,676 A | * | 1/1969 | Field et al. ............... 210/694 |
| 3,892,661 A | * | 7/1975 | Siviour et al. ............ 210/694 |
| 4,134,831 A | * | 1/1979 | Dawson et al. .......... 208/262.5 |
| 5,391,300 A | | 2/1995 | Webb et al. .............. 210/670 |
| 5,461,186 A | * | 10/1995 | Lebowitz et al. ......... 588/249 |
| 5,587,324 A | | 12/1996 | Roy et al. ................ 436/183 |
| 5,855,666 A | | 1/1999 | Kao et al. ................ 106/718 |
| 6,100,382 A | | 8/2000 | Wolfe et al. .............. 530/370 |
| 6,123,483 A | * | 9/2000 | Langenecker .......... 405/128.75 |
| 6,207,073 B1 | | 3/2001 | Wolfe et al. .............. 252/175 |
| 6,238,570 B1 | | 5/2001 | Sivavec ................... 210/717 |
| 6,352,644 B1 | | 3/2002 | Hawthorne et al. ....... 210/634 |
| 6,386,796 B1 | | 5/2002 | Hull ..................... 405/128.25 |
| 6,398,960 B1 | | 6/2002 | Borden et al. ............ 210/610 |
| 6,403,044 B1 | * | 6/2002 | Litz et al. ................ 588/313 |

(Continued)

FOREIGN PATENT DOCUMENTS

CA    1034686    *  7/1978

(Continued)

OTHER PUBLICATIONS

Upal Ghosh et al., "Microscale location, characterization, and association of polycyclic aromatic hydrocarbons on harbor sediment particles," vol. 34, No. 9, 2000/Environment Science & Technology, 34, pp. 1729-1736.

(Continued)

*Primary Examiner*—John Kreck
(74) *Attorney, Agent, or Firm*—Lumen Intellectual Property Services, Inc.

(57) ABSTRACT

To overcome obstacles faced by current remediation technologies for contaminated sediments, the present invention provides a new strategy based on in situ control of hydrophobic organic contaminants (HOC) bioavailability. The strategy employs the addition of activated carbon sorbents to sediments. These activated carbon materials sorb HOC contaminants strongly, reduce release of HOCs into water, and reduce HOC uptake by benthic biota, thereby reducing environmental exposure and human health risk to such contaminants. By in situ sorbing the contaminants, the inventive approach reduces environmental exposure and avoids massive material removal while controlling food web transfer of HOCs including polychlorinated biphenyls (PCBs).

16 Claims, 1 Drawing Sheet

U.S. PATENT DOCUMENTS

2002/0034421 A1 3/2002 Kukor et al. .......... 405/128.75
2002/0143226 A1 10/2002 Saha et al. .................. 588/205

FOREIGN PATENT DOCUMENTS

GB 2255087 * 10/1992
JP 50-150251 * 12/1975

OTHER PUBLICATIONS

Gerard Cornelissen et al., "Rapidly desorbing fractions of PAHs in contaminated sediments as a predictor of the extent of bioremediation," Environmental Science & Technology, 1998, 32 (7), 966-970.

R. G. Luthy et al., "Microscal PAH location and association with organic matter and effects on biotreatment and bioaccumulation," American Chemical Society 220th National Meeting, Chemical Speciation and Reactivity in Water Chemistry and Water Technology:Symposium in Honor of James J. Morgan, Washington, DX, Aug. 2000.

Mike Palermo, "DOER Contaminated Sediments Research Summary," ULSL Army Engineet Reseatch and Development Center, Environmental Laboratory, 1999, retrieved on Sep. 24, 2002. Retrieved from the internet: <URL: http://www.wes.army.mil/el/dots/doer/fsconsed.html>.

"EPA's contaminated sediment management strategy," United State Environmental Protection Agency, Office of Water, 4305, EPA-823-R-98-001, Apr. 1998.

Corlis W. West et al., "Amendment of sediments with a carbonaceous resin reduces bioavailability of polycyclic aromatic hydrocarbons," Environmental Toxicology and Chemistry, vol. 20, No. 5, pp. 1104-1111, 2001.

Samuel N. Luoma et al., "Determination of selenium bioavailability to a benthic bivalve form particulate and solute pathways," Environ Sci. Technol. 1992, 26, 485-491.

Jeffrey W. Talley et al., "Particle-scale understanding of the bioavailability of PAHs in sediment," Envirom. Sci. Techol. 2002, 36, 477-483.

Chapter Eight, Granular Bed and Precoat Filtration, in Water Quality and Treatment-A Handbook of Community Water Supplies, American Water Works Association, Mc-Graw-Hill, Fifth Edition, 1999.

Larsen et al. "Pore Structure of the Argonne Premium Coals", Energy and Fuels, 1995, vol. 9, pp. 324-330.

Ng et al. "Some Physical Properties of Canadian Coals and Their Effects on Coal Reactivity", Fuel, 1984 vol. 63, pp. 1564-1569.

Lakatos et al. "Influence of Coal Properties on Mercury Uptake from Aqueous Solution", Energy and Fuels, 1999, vol. 13, pp. 1046-1050.

Chapter 15 of Water Treatment-Principles and Design, MWH, John Wiley $ Sons, inc., Second Edition, 2005.

Pavlou et al. "Strategies and Technologies for Cleaning Up Contaminated Sediments in the Nation's Waterways: A Study by the National Research Council." National Conference on Management and Treatment of Contaminated Sediments, 1998 p. 12-17.

* cited by examiner

IN SITU STABILIZATION OF PERSISTENT HYDROPHOBIC ORGANIC CONTAMINANTS IN SEDIMENTS USING COAL- AND WOOD-DERIVED CARBON SORBENTS

CROSS-REFERENCE TO RELATED APPLICATIONS

This application claims the benefit of U.S. provisional patent application No. 60/333,049, filed Nov. 13, 2001, which is hereby incorporated herein by reference in its entirety.

STATEMENT REGARDING FEDERALLY SPONSORED RESEARCH OR DEVELOPMENT

This invention was supported in part by grant number DACA72-01-C-0002 from the Department of Defense. The U.S. Government has certain rights in the invention.

FIELD OF THE INVENTION

This invention relates generally to remediation technologies for contaminated sediments. More particularly, it relates an inexpensive, nonremoval, in situ remediation technology for submerged sediments contaminated with persistent hydrophobic organic compounds (HOCs) through use of coal- and wood-derived carbon sorbents (i.e., black carbon) to control contaminant bioavailability and release to water.

BACKGROUND ART

In 1997, the U.S. Environmental Protection Agency (EPA) estimated that 10 percent of the nation's lakes, rivers, and bays have sediment contaminated with toxic chemicals that can kill fish living in those waters or impair the health of people and wildlife who consume contaminated fish or water. The magnitude of the sediment contamination problem in the United States is evidenced by the more than 2,100 state advisories that have been issued against consuming fish. An important class of such contaminants are hydrophobic organic compounds (HOCs), which includes polycyclic aromatic hydrocarbons (PAHs), polychlorinated biphenyls (PCBs), pesticides (such as DDT), and some organometallic compounds (such as dimethyl mercury). HOCs are important contaminants of concern in sediments because of their association with fine-grained, organic-rich sediment material. HOCs persist in sediments for many years and exhibit the potential for bioaccumulation and toxicity. Thus, HOCs in sediments pose risks to human health and the environment.

The importance of the HOC contamination of sediments is exemplified by PCBs, which are long-lived in sediments and leach into overlying water, accumulate in benthic invertebrates, and transfer through the food chain to animals and humans. This has resulted in 697 fish consumption advisories for PCBs in the U.S. in 1998.

The cost of remediating contaminated sediments often runs into billions of dollars. The most commonly considered technologies for contaminated sediment management are (1) dredging and placement in confined disposal facilities (CDFs) or hazardous waste landfills and (2) capping, an option for containment in engineered subaqueous sites. However, either option is expensive and requires large-scale material handling and long-term management. Further, since most PCB-contaminated sediment sites are large, the application of any remediation option is a difficult task.

Traditional sediment treatments based on dredging are costly and problem-prone and will leave residual PCBs, and thus do not completely eliminate environmental and human health risks. In addition, dredging operations can cause temporary high levels of contaminants in the water column due to resuspension of buried sediments and release of pore water. Dredging also destroys aquatic habitats. Further, all known sediment treatment technologies will leave residual contaminants. In situ treatment is thus needed even if dredging is employed.

Therefore, active, in situ stabilization methods that do not involve sediment relocation are attractive.

Prior in situ sediment stabilization efforts include capping with clean sand and geofabric. Some major unresolved issues regarding the long-term efficiency of caps include maintenance of cap integrity during high flow or storm events, physical alteration of the indigenous habitat, and organisms that can burrow into the caps and impair their efficacy.

U.S. Pat. No. 5,391,300, "METHOD FOR THE REMOVAL OF HALOGENATED ORGANIC COMPOUNDS FROM AN ENVIRONMENT", issued to Webb et al. and assigned to General Electric Company of N.Y., U.S.A., Feb. 21, 1995, discloses sorbing halogenated organic compounds such as PCBs and PAHs from aqueous solutions and mixtures by a variety of organic polymeric materials. Recently, the use of Ambersorb polymeric resin has been explored for in situ remediation and containment of contaminants, as reported by West, W. W.; Kosian, P. A.; Mount, D. R.; Makynen, E. A.; Pasha, M. S.; Sibley, P. K.; Ankley, G. T. "Amendment of Sediments with a Carbonaceous Resin Reduces Bioavailability of Polycyclic Aromatic Hydrocarbons", *Environmental Toxicology and Chemistry*, 20, 1104–1111. The major uncertainties regarding the feasibility of these approaches are: the high cost of the sorbent material, the permanence of the treatment effectiveness, and the lack of knowledge of sequestration processes controlling phase transfer and stabilization of the contaminants.

There exists a continuing need, therefore, for an inexpensive, nonremoval, in situ remediation technology for submerged sediments contaminated with persistent hydrophobic organic compounds.

SUMMARY

To overcome the obstacles faced by conventional remediation technologies, the present invention provides a new strategy based on in situ control of HOC bioavailability through the use of coal- and wood-derived carbon sorbents (i.e., black carbon). The strategy employs the addition to sediments of coal- and wood-derived carbon sorbents, so-called black carbon particles like activated carbon, char, charcoal, coal, and coke. These black carbon materials sorb HOC contaminants strongly and reduce release of HOCs into water, reduce HOC uptake by benthic biota, thereby reducing environmental exposure and human health risk to such contaminants. By sorbing the contaminants, this approach reduces environmental exposure and avoids massive material removal while controlling food web transfer of HOCs including PCBs. This is a cost-effective and efficient remediation technology for contaminated sediment management that can significantly reduce expenditures and other problems with conventional approaches for environmental restoration of contaminated sediments.

DETAILED DESCRIPTION

Figure 1:
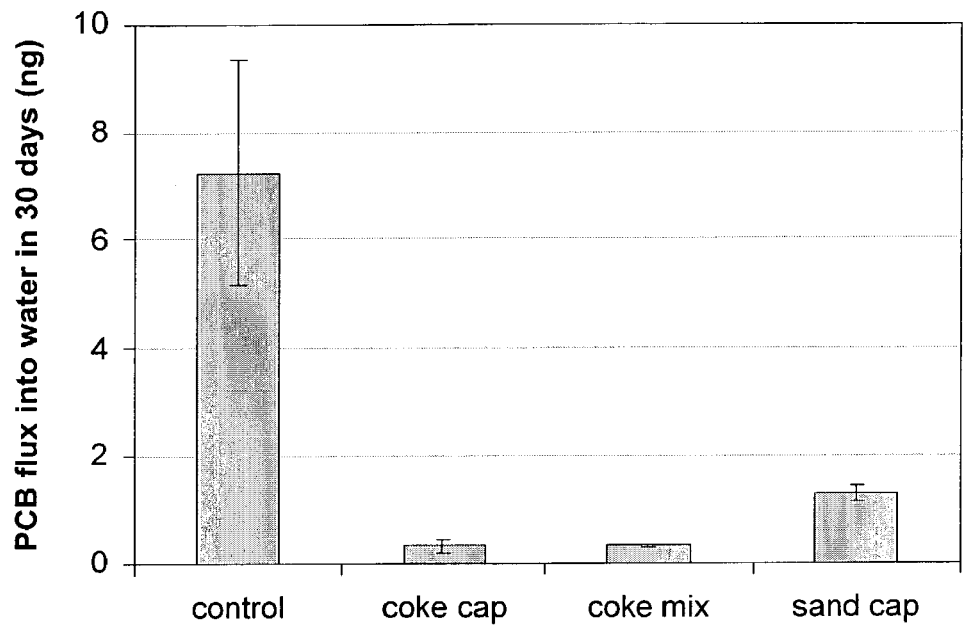
FIG. 1 illustrates effect of adding coke to PAH contaminated sediments in reducing the flux of PAHs to overlying water, according to an aspect of the present invention.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

We recently discovered that PCBs and PAHs are very strongly bound to black carbon particles (e.g., charcoal, coal, coke, and char) in freshwater and marine sediments. Such PCBs and PAHs bound to black carbon particles do not appear to be easily leachable. Biological tests show that PAHs associated with black carbon in sediments are not available to microorganisms for biodegradation and also not available to earthworms for biological uptake. This means that black carbon particles in a wide variety of sediments can act as strong sorbents, which, naturally over time, tend to concentrate HOCs and make these compounds less available for organisms. According to an aspect of the invention, the addition/deployment of fresh black carbon materials such as charcoal, coal, coke, char, and/or activated carbon to HOC-contaminated sediments would enhance this natural process of sequestration, thereby reducing contaminant availability and biological uptake to the aqueous phase and biota.

The idea of applying a coal- and wood-dervied sorbent like charcoal, coal, coke, char, and/or activated carbon in situ to sequester HOCs in sediments is believed to be new. To date, this idea does not appear to have been suggested or tried before. U.S. Pat. No. 5,587,324, "PROCESS FOR COAL TAR REMEDIATION", issued to Roy et al. and assigned to Mobil Oil Corporation of Fairfax, Va., U.S.A. and Electric Power Research Institute, Inc. of Palo Alto, Calif., U.S.A., Dec. 24, 1996, discloses a process for coal tar remediation employing petroleum coke as admixture to coal-tar contaminated soil to soak up the liquid coal tar. This prior art process does not remediate HOC contaminated sediments. Activated carbon is commonly used to remove organics from water. For example, in an activated carbon filter, water is passed through the filter where the carbon collects the materials to be removed from the water. But this technology does not address contaminated sediments. Activated carbon has not been used in situ to sequester HOCs in sediments.

Activated carbon has much higher surface area and sorption capacity compared to charcoal, coal, coke, and char, and is expected to work more efficiently. However, coke is inexpensive compared to activated carbon. Change in PCB availability was verified via physicochemical and biological tests after addition of coke and activated carbon to PCB contaminated sediment from Hunters Point, Calif. Aqueous desorption kinetic and equilibrium tests were performed using sediment that had been contacted with coke for 28 days. Aqueous desorption kinetic tests showed that coke treatment caused a 65% reduction in the release of PCBs from Hunters Point sediment during a 2-week period. Similarly, aqueous equilibrium tests showed a 50% reduction in aqueous PCB concentrations for sediment treated with coke and a 85% reduction in aqueous PCB concentrations for sediment treated with activated carbon. These results show that the addition of coke and activated carbon reduces the availability of PCBs and PAHs to the aqueous medium in contact with the sediment.

To see whether a particular mode of deployment would affect the release of PCBs from sediment into overlying water, different modes of deployment of carbon sorbent were compared. FIG. 1 shows the effect of adding coke to PAH contaminated sediments, as a cap or by mixing in the sediment, on the flux of PCBs from sediment into overlying water. In this example, a quantity of PAH and PCB contaminated field sediment were separated into four samples. Each sample was respectively: untreated, capped with coke, mixed with coke, and capped with non-sorptive sand. Coke was added 3.4% by weight to the respective sample sediments. As a result of coke application, both as a cap and as a mixture, it can be seen that there was a 95% reduction in flux of PCBs from the sediment compared to that of untreated sample sediment.

Also, coke is four times more efficient in reducing PCB flux into water compared to traditional capping techniques using clean sand, as shown in FIG. 1. Reduction of PCB flux from contaminated sediment into water reduces the environmental impact of PCB contaminated sediments. The addition of activated carbon (which has significantly higher surface area compared to coke) reveals more dramatic results in the reduction of PCB availability.

Figure 2:
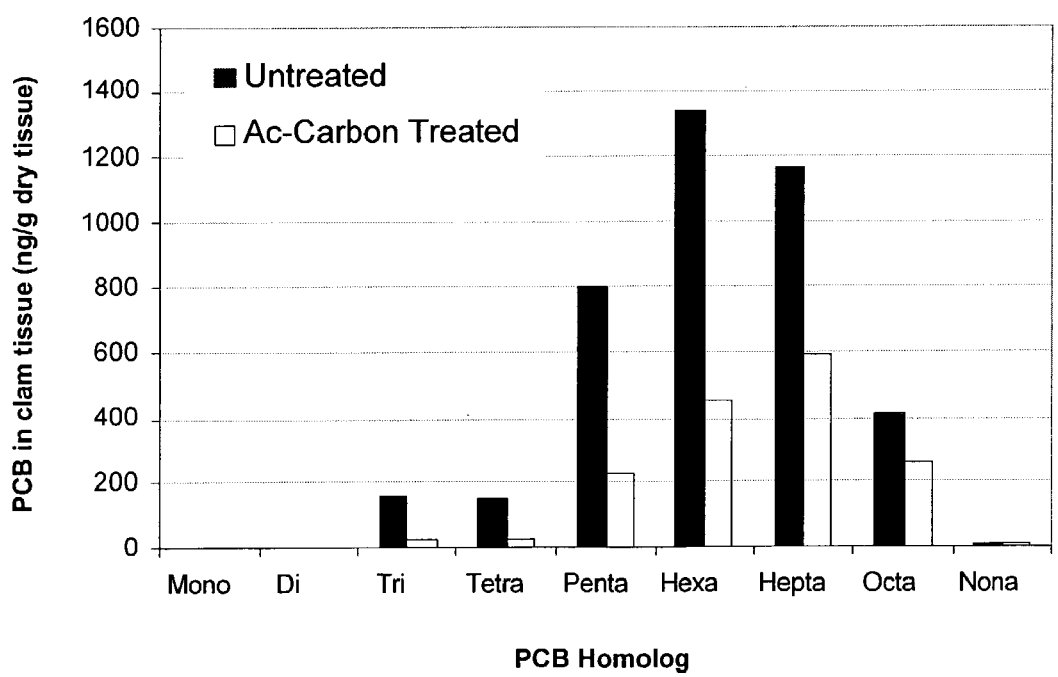
FIG. 2 schematically shows reduction of PCB bioaccumulation in clam tissue following in situ treatment of contaminated sediment with activated carbon, according to another aspect of the present invention.

Our studies with PCB contaminated sediment and sediment-dwelling organisms showed that PCB accumulation significantly decreases as a result of activated carbon amendment. In an exemplary test, PCB bioaccumulation was determined by exposing a sediment dwelling clam (*Macoma balthica*) for a 28-day period to PCB contaminated sediment from Hunters Point, Calif. Prior to exposing the clams to the sediment, the sediment was mixed for one month in closed vessels with 3.4% activated carbon dry weight, which is double the total organic carbon content of the sediment. For a control sample, untreated sediment was mixed similarly. Clams were then added to the activated carbon treated sediment. FIG. 2 shows that the reduction in PCB uptake by homolog varied with PCB chlorination level and ranged from about 86% for the trichlorobiphenyls to about 18% for the nonachlorobiphenyls. The lower chlorinated PCB homologs are more strongly affected by the activated carbon treatment process. Higher chlorinated PCB homologs may be limited by the slow rates of mass transfer of PCBs from sediment into the sorbent carbon. Average reduction of total PCB uptake in clam tissue was about 60% for a sediment-sorbent contact period of one month. Longer contact periods are expected to result in greater efficiencies.

The above findings are supported by measuring the biological uptake absorption efficiency for 2,2',5,5'-tetrachlorobiphenyl (a PCB compound) and benzo(a)pyrene (BaP, a PAH compound) from prepared particles by *M. balthica*. Clams were fed $^3$H-labeled BaP and $^{14}$C-labeled PCB-spiked particles. These particles are representative of some of the black-carbonaceous particle types observed in Hunters Point and Milwaukee Harbor sediments. These spiked particles are coke, anthracite, wood, char, peat, and coal-based activated carbon. Labeled diatoms [*Phaeodactylum tricornutum*] were used as a representative natural foot The inert particles were ground and wet sieved to 20–25 µm, and spiked with the $^3$H-BaP and $^{14}$C-PCB by mixing in water for 21 days in vials with PCB doped on the vial walls. Ten-day old diatom cultures were prepared similarly. The pulse-chase feeding method was adopted to determine clam absorption efficiencies. The pulse-chase feeding method is known in the art and thus is not further described herein for the sake of brevity. Exemplary teachings can be found in Luoma, S. N.; Johns, C.; Fisher, N. S.; Steinberg, N. A.; Oremland R. S.; Reinfelder J. R. "Determination of Selenium Bioavailability to a Benthic Bivalve from Particulate and Solute Pathways" *Environmental Science & Technology*, 26, 485–491, 1992.

Clams were fed particles for eight hours and then placed in individual depuration vessels and fed unlabeled diatoms for 88 hours with feces collected at intervals by filtering. Feces and soft tissue from individual clams were analyzed for $^3$H-BaP and $^{14}$C-PCB. Clam absorption efficiency was computed as the physiological uptake of contaminant in soft tissues, and calculated for each clam as the ratio of $^3$H-BaP or $^{14}$C-PCB remaining in the clam to that remaining in tissue plus that depurated over 88 hrs as measured in the sum of the feces samples. Absorption efficiency was found lowest for activated carbon [<2%] and highest for wood [75%] and diatoms [85–90%]. It is clear that activated carbon dramatically reduces the biological absorption of the organic contaminant.

Thus, the application of fresh, highly adsorbing, coal- and wood-derived carbon media to sediments in the field results in the transfer of hydrophobic contaminants from the available sediment components to the applied sorbent phase where the contaminants become much less bioavailable due to the strong binding to the sorbent material. These results point to a new concept for sediment management based on addition of material like activated carbon to sediment and in situ active treatment to reduce the bioavailability of persistent, hydrophobic organic contaminants. The efficiency of the technology depends on carbon sorbent type, the effects of different carbon dosages, contact times with sediment, and carbon particle sizes. The present invention is also applicable to other hydrophobic contaminants such as pesticides including DDT, and organometallics such as dimethyl mercury.

The addition of coal- or wood-based carbon sorbent to contaminated sediment is a viable, cost effective, in situ stabilization technology. It is anticipated that the amount of carbon sorbent added would be comparable to the organic carbon content of the sediment, about one to five percent by weight of sediment in the contaminated biologically active zone of the sediment. Depending upon the specific nature of the sediment being investigated, the added carbon sorbent can be in the range of 0.5 to 10% by weight of sediment. At present time, the material costs for representative treatments of 1 to 5% by weight of sediment are about $0.45 to $2.25/m$^3$ using coke breeze at $35/ton, or about $4.5 to $22.5/m$^3$ using regenerated activated carbon at $350/ton. The cost of field application of the proposed technology is expected to be low primarily because of the low cost of the sorbent material and because this is an in situ process not involving any sediment relocation. Thus, the cost of materials for the stabilization process is low and very attractive compared with the cost of currently used disposal options. For example, average cost of PCB contaminated sediment remediation based on dredging and disposal carried out at nineteen areas of concern in the Great Lakes basin is $187/m$^3$, according to data reported in 1999 by the Great Lakes Water Quality Board. A higher cost of $256/m$^3$ is expected for the dredging and disposal of PCB contaminated sediment in the ongoing Hudson River cleanup effort in New York, U.S.A.

It will be clear to one skilled in the art that the above embodiments may be altered in many ways without departing from the scope of the invention. For example, the physical properties of the carbon-based sorbent additive can be tailored or modified to aid future retrieval of the sorbent from the sediment if required or desired. Modification of the sorption properties of carbon-based sorbent can potentially enhance the sorption of heavy metal contaminants that may be present in the sediment. For example, adding sulfur to activated carbon to sorb mercury. Additionally, reactive substances such as zero valent iron can be incorporated into the carbon-based additive for possible dechlorination of chlorinated compounds including PCBs or pesticides. Moreover, particle size and density of the carbon-based sorbent material can be modified to beneficially control resuspension. Accordingly, the scope of the invention should be determined by the following claims and their legal equivalents.

What is claimed is:

1. A method for remediating contaminated sediments, comprising:
    mixing activated carbon materials with the contaminated sediments in situ to enhance contaminant sequestration, thereby reducing contaminant availability to the aqueous phase and biota, and reducing biological uptake of the contaminants,
    wherein the contaminants are selected from the group consisting of polycyclic aromatic hydrocarbons (PAHs), polychlorinated biphenyls (PCBs), and chlorinated organic compounds including pesticides, and
    wherein the weight of activated carbon materials mixed into the contaminated sediments is between 0.5% and 10% of the weight of the contaminated sediments.

2. The method of claim 1, wherein the activated carbon materials have a higher surface area and sorption capacity compared to charcoal, coal, coke, and char.

3. The method of claim 1, wherein the activated carbon materials added to the contaminated sediments reduce the flux of the contaminants into water.

4. The method of claim 1, wherein the activated carbon materials added to the contaminated sediments reduce the biological uptake of the contaminants by benthic organisms.

5. The method of claim 1, further comprising:
    modifying properties of the activated carbon materials to enhance sorption, wherein the properties include sorption properties and physical properties.

6. The method of claim 1, further comprising:
    modifying particle size and density of the activated carbon materials to control resuspension.

7. A method for remediating contaminated sediments, comprising:
    deploying activated carbon materials to the contaminated sediments in situ to enhance contaminant sequestration, thereby reducing contaminant availability to the aqueous phase and biota, and reducing biological uptake of the contaminants,
    wherein the contaminants are selected from the group consisting of polycyclic aromatic hydrocarbons (PAHs), polychlorinated biphenyls (PCBs), and chlorinated organic compounds including pesticides, and
    wherein the weight of activated carbon materials deployed to the contaminated sediments is between 0.5% and 10% of the weight of the contaminated sediments.

8. The method of claim 1, wherein the weight of activated carbon materials mixed into the contaminated sediments is between about 1% and about 5% of the weight of the contaminated sediment.

9. The method of claim 7, wherein the deploying act comprises mixing the activated carbon into the contaminated sediments.

10. The method of claim 7, wherein the deploying act comprises capping the contaminated sediments with the activated carbon.

11. The method of claim 7, wherein the activated carbon materials have a higher surface area and sorption capacity compared to charcoal, coal, coke, and char.

12. The method of claim 7, wherein the activated carbon materials deployed to the contaminated sediments reduce the flux of the contaminants into water.

13. The method of claim 7, wherein the activated carbon materials deployed to the contaminated sediments reduce the biological uptake of the contaminants by benthic organisms.

14. The method of claim 7, further comprising modifying properties of the activated carbon materials to enhance sorption, wherein the properties include sorption properties and physical properties.

15. The method of claim 7, further comprising modifying particle size and density of the activated carbon materials to control resuspension.

16. The method of claim 7, wherein the weight of activated carbon materials deployed to the contaminated sediments is between about 1% and about 5% of the weight of the contaminated sediment.

* * * * *

UNITED STATES PATENT AND TRADEMARK OFFICE
CERTIFICATE OF CORRECTION

| | | |
|---|---|---|
| PATENT NO. | : 7,101,115 B2 | Page 1 of 1 |
| APPLICATION NO. | : 10/272681 | |
| DATED | : September 5, 2006 | |
| INVENTOR(S) | : Richard G. Luthy | |

It is certified that error appears in the above-identified patent and that said Letters Patent is hereby corrected as shown below:

In the BRIEF DESCRIPTION OF THE FIGURES, column 3, lines 3-4, each occurrence of the word "PHA" should be replaced with the word --PCB--.

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

Page 1 of 1

PATENT NO. : 7,101,115 B2
APPLICATION NO. : 10/272681
DATED : September 5, 2006
INVENTOR(S) : Richard G. Luthy et al.

It is certified that error appears in the above-identified patent and that said Letters Patent is hereby corrected as shown below:

IN THE SPECIFICATION

Please change the following paragraph starting in Column 1, line 15 of the subject patent from "STATEMENT REGARDING FEDERALLY SPONSORED RESEARCH OR DEVELOPMENT
This invention was supported in part by grant number DACA72-01-C-0002 from the Department of Defense. The U.S. Government has certain rights in the invention."

to

"STATEMENT REGARDING FEDERALLY SPONSORED RESEARCH OR DEVELOPMENT
This invention was made with Government support under contract DACA42-00-C-0027 awarded by the Department of the Army. The Government has certain rights in the invention."

Signed and Sealed this
Fifteenth Day of March, 2016

Michelle K. Lee
*Director of the United States Patent and Trademark Office*